US008269599B2

(12) United States Patent
Goza

(10) Patent No.: US 8,269,599 B2
(45) Date of Patent: Sep. 18, 2012

(54) COMPUTER WORKSTATION AND METHOD

(76) Inventor: Roger Goza, Houston, TX (US)

(*) Notice: Subject to any disclaimer, the term of this patent is extended or adjusted under 35 U.S.C. 154(b) by 1325 days.

(21) Appl. No.: 11/863,306

(22) Filed: Sep. 28, 2007

(65) Prior Publication Data

US 2008/0189797 A1 Aug. 7, 2008

Related U.S. Application Data

(60) Provisional application No. 60/899,982, filed on Feb. 7, 2007.

(51) Int. Cl.
*G05B 19/00* (2006.01)

(52) U.S. Cl. ...... 340/5.2; 340/5.73; 340/5.8; 340/568.1; 726/9; 726/35; 312/223.3; 221/92

(58) Field of Classification Search .................... 726/35, 726/9; 340/5.2, 5.73, 5.8, 568.1; 312/223.3; 221/2

See application file for complete search history.

(56) References Cited

U.S. PATENT DOCUMENTS

| | | | | | |
|---|---|---|---|---|---|
| 4,267,942 | A | * | 5/1981 | Wick et al. | 221/2 |
| 4,695,954 | A | * | 9/1987 | Rose et al. | 221/15 |
| 4,785,969 | A | * | 11/1988 | McLaughlin | 221/2 |
| 4,811,764 | A | * | 3/1989 | McLaughlin | 141/98 |
| 4,839,806 | A | * | 6/1989 | Goldfischer et al. | 700/231 |
| 4,847,764 | A | * | 7/1989 | Halvorson | 700/231 |
| 4,967,928 | A | * | 11/1990 | Carter | 221/2 |
| 5,142,484 | A | * | 8/1992 | Kaufman et al. | 222/638 |
| 5,263,596 | A | * | 11/1993 | Williams | 221/153 |
| 5,377,864 | A | * | 1/1995 | Blechl et al. | 221/2 |
| 5,502,944 | A | * | 4/1996 | Kraft et al. | 53/55 |
| 5,638,985 | A | * | 6/1997 | Fitzgerald et al. | 221/125 |
| 5,713,485 | A | * | 2/1998 | Liff et al. | 221/2 |
| 5,805,455 | A | * | 9/1998 | Lipps | 700/231 |
| 5,871,442 | A | * | 2/1999 | Madarasz et al. | 600/310 |
| 5,912,818 | A | * | 6/1999 | McGrady et al. | 700/232 |
| 5,960,085 | A | * | 9/1999 | de la Huerga | 340/5.61 |
| 6,011,999 | A | * | 1/2000 | Holmes | 700/231 |
| D434,578 | S | | 12/2000 | Goza | |
| D435,361 | S | | 12/2000 | Goza | |
| D440,424 | S | | 4/2001 | Goza | |
| 6,226,752 | B1 | * | 5/2001 | Gupta et al. | 726/9 |
| 6,300,873 | B1 | * | 10/2001 | Kucharczyk et al. | 340/568.1 |
| 6,330,856 | B1 | * | 12/2001 | Fitzgerald et al. | 100/52 |
| 6,422,463 | B1 | * | 7/2002 | Flink | 235/382 |
| 6,658,322 | B1 | * | 12/2003 | Frederick et al. | 700/236 |
| 6,882,269 | B2 | * | 4/2005 | Moreno | 340/5.73 |
| 7,178,469 | B2 | | 2/2007 | Goza | |
| 7,266,849 | B1 | * | 9/2007 | Gregory et al. | 726/34 |
| 7,323,967 | B2 | * | 1/2008 | Booth et al. | 340/5.73 |
| 8,019,470 | B2 | * | 9/2011 | Meek et al. | 700/237 |
| 8,166,524 | B2 | * | 4/2012 | Sentinelli | 726/5 |
| 2002/0133725 | A1 | * | 9/2002 | Roy et al. | 713/202 |
| 2003/0080655 | A1 | * | 5/2003 | Goldberg | 312/290 |
| 2004/0039920 | A1 | * | 2/2004 | Kim et al. | 713/185 |

(Continued)

*Primary Examiner* — Benjamin C Lee
*Assistant Examiner* — Quang D Pham
(74) *Attorney, Agent, or Firm* — Bushman & Associates, P.C.

(57) ABSTRACT

A system and/or method to control access to secured compartments in a facility. Computers positioned throughout the facility are interfaced to respective locking mechanisms to operate the locking mechanism in response to access codes, which may be transmitted over the network. Additional steps may involve programming an authorization computer for providing access codes in whole or part for use with the computers. One or more access points may be functionally coupled to a computer system and/or to the locking mechanism and accessible to users for entry of requests for access to the secured compartment.

22 Claims, 1 Drawing Sheet

U.S. PATENT DOCUMENTS

2004/0046020 A1* 3/2004 Andreasson et al. ......... 235/385
2004/0059463 A1* 3/2004 Coughlin ...................... 700/229
2004/0150300 A1* 8/2004 Wyatt ......................... 312/223.3
2004/0155752 A1* 8/2004 Radke .......................... 340/5.53
2005/0012437 A1* 1/2005 Schulman .................. 312/223.3
2006/0138915 A1* 6/2006 Goldberg ................... 312/223.3
2008/0136649 A1* 6/2008 Van De Hey ............... 340/573.1
2008/0148377 A1* 6/2008 Kumar et al. ..................... 726/9
2009/0091453 A1* 4/2009 Ishida et al. ............... 340/572.1

* cited by examiner

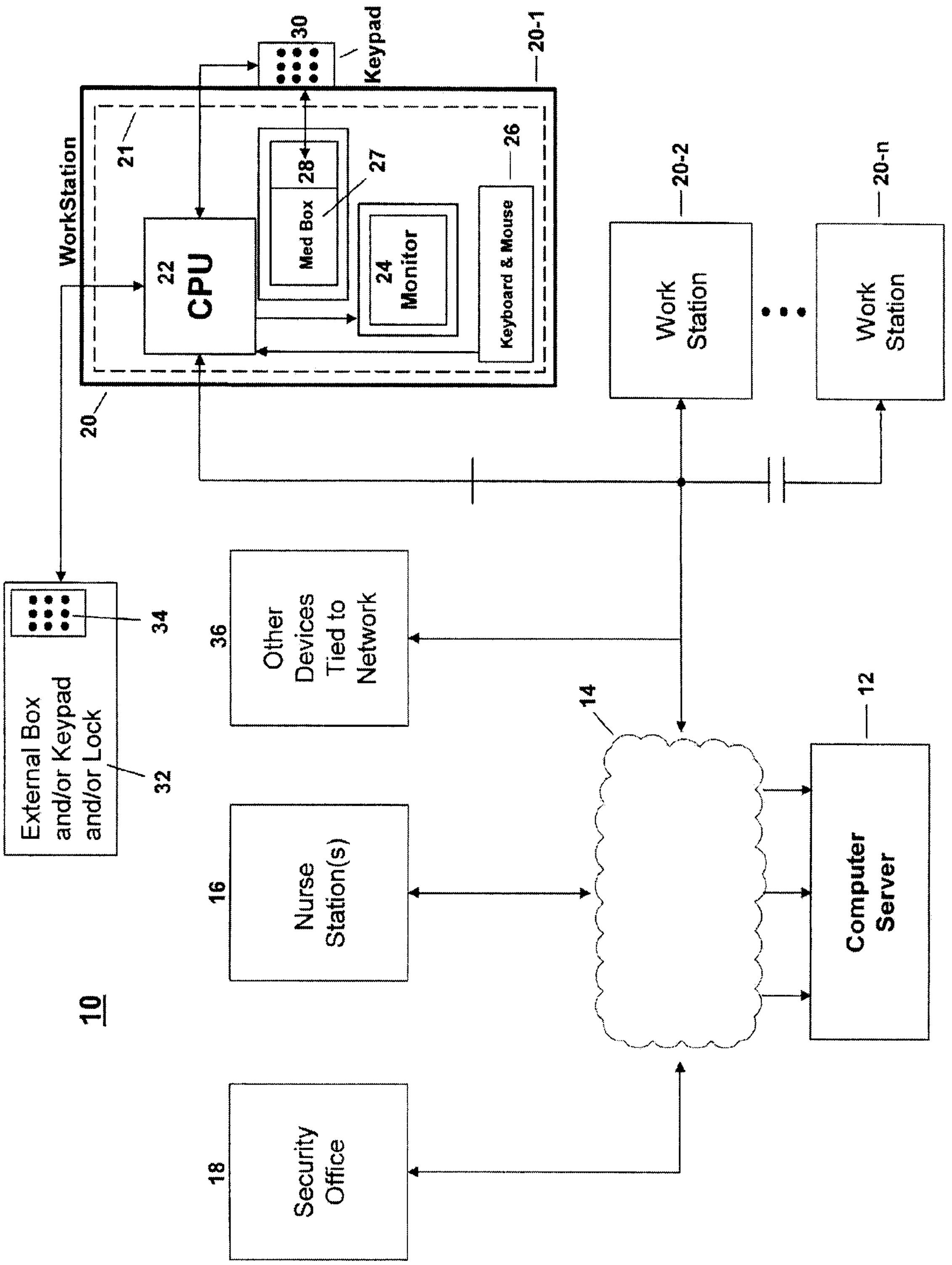
10
WorkStation
CPU
22
Med Box
28
27
24
Monitor
Keyboard & Mouse
26
21
20
20-1
30
Keypad
Work Station
20-2
Work Station
20-n
External Box and/or Keypad and/or Lock
32
34
Other Devices Tied to Network
36
Nurse Station(s)
16
Security Office
18
14
Computer Server
12

COMPUTER WORKSTATION AND METHOD

CROSS REFERENCE TO RELATED APPLICATION

This application claims the priority of U.S. Provisional Application No. 60/899,982 filed on Feb. 7, 2007, the disclosure of which is incorporated herein by reference for all purposes.

FIELD OF THE INVENTION

The present invention relates generally to computer workstations, and in one particular embodiment relates to a method and apparatus for selectively restricting access to one or more secured compartments.

BACKGROUND OF THE INVENTION

There are numerous instances in industrial, medical, and even home environments where it is desirable to provide a compact workstation, such as those that may be adapted to house computer equipment. Ideally, such a workstation occupies a minimum amount of space when not in use, but, when in use, can provide a convenient working environment for a user. Articulating wall mounted workstations that can be opened for use and subsequently returned to a closed position are adequately proposed in the prior art. (As used herein, the term "articulating" is intended to refer to equipment that can be folded, compressed, nested, or otherwise adjusted in some manner, and in particular, equipment that articulates between an "open" or in-use configuration and a "closed" or idle configuration.)

In the case of a workstation adapted for housing computer equipment, a useful configuration is one in which the workstation is adapted to accommodate a central processing unit (CPU) assembly, a monitor, a keyboard and mouse and/or other user input devices, as well as perhaps other familiar computer peripheral devices (printers, mass storage devices, scanners, etc.)

Workstations as described above have proven to be especially beneficial when deployed and utilized in hospital environments. Other applications have also been contemplated, including dormitory rooms, hotel rooms or common areas in a motel/hotel, courtesy business centers such as are often found in hotels, airports and the like, as well as industrial/commercial facilities of virtually any type, etc. One example is proposed in presently pending U.S. patent application Publication No. 2005/0022699 filed in the name of Goza et al. entitled "Retractable Multiposition Furniture System." The ornamental design of workstations generally falling within the foregoing description is disclosed in U.S. Design Pat. No. D434,578 to Goza, entitled "Computer Workstation;" in U.S. Design Pat. No. D435,361 to Goza, entitled "Computer Workstation;" and in U.S. Design Pat. No. D440,424 to Goza, entitled "Retractable Desk." Each of the aforementioned Goza patents is hereby incorporated by reference herein in its respective entirety.

As would doubtless be appreciated by those of ordinary skill in the art, articulating workstations such as discussed above may be deployed in various environments where the workstation may advantageously include a plurality of separate compartments, and where access to one or more of those compartments is selectively restricted. That is, it may be desirable or necessary for access to and use of certain portions of the workstation to be restricted to one or more authorized users. The hospital environment is one example (but by no means the only example) where ensuring that access to a workstation compartment be restricted to authorized users only.

In particular, a workstation adapted for deployment and use in a hospital environment may include a compartment for storing medications or other controlled substances. In such cases, it would clearly be desirable to ensure that only persons rightfully entitled to the contents of a secured compartment are capable of gaining access.

In some limited cases, it may be even further desirable to have more than one selectively secured compartment, for example, one compartment for securing medications as described above, and another compartment for securing the user-interface components (e.g., keyboard and mouse) of the internal computer. By separately restricting access to the computer, it can be ensured that information obtainable through use of the computer (e.g., patient records or other highly sensitive information) is not readily available to unauthorized users.

SUMMARY OF THE INVENTION

In one possible embodiment, it may be desirable to reduce the time nurses spend walking back and forth when delivering medicines to multiple patients. For example in a typical large hospital, nurses might walk four to seven miles every day back and forth to deliver medicines. While the practice of Nurse's spending extensive time walking is well known and typical, in accord with one embodiment of the invention it would be desirable to greatly reduce the necessity of spending so much time walking, giving the nurses more time for patient care.

In another possible embodiment, the present invention may be directed to a securable articulating workstation that incorporates access control features, which make it possible to limit functional access to components housed within the workstation to a limited number of pre-specified users.

In accordance with another possible aspect of the invention, a plurality of securable workstations may be deployed and/or functionally interlinked by means of a computer network or similar communications infrastructure for use in controlling a plurality of secured compartments. This infrastructure may also permit certain functional information relating to workstations or the equipment housed within the workstations to be transmitted to a centralized location for monitoring and/or control of workstation access.

In accordance with yet another possible aspect of the invention, individual workstations may be coupled to a central network server. In addition, workstations may be preferably capable of being functionally coupled to other equipment in proximity to the workstation such as proximity detectors, RFID detectors, and other input devices as discussed herein.

Preferably, a system administrator may be provided with the capability of communication directly with each of the plurality of deployed workstations. Thus, a remotely located administrator or an administrator-controlled computer may permit or restrict access to a workstation and/or a portion of a workstation, such as a separate, selectively locked or otherwise secured compartment, through the communication of electronic access codes for engaging or disengaging security devices (electronic locks, alarms, etc.) Access may be permitted or restricted based upon entry of a security access code or other identifying information that is communicated to the workstation by any means, for example, by means of an electronic keypad, a "smart card" or RFID transponder, biometric sensing systems, and/or the like. Utilization of the internal computer's own keyboard for the purposes of gaining entry to a secured compartment in a workstation may also be contemplated. In one embodiment, a keypad or other input may be used to gain access to a computer's keypad or mouse, thereby restricting access to the computer.

In accordance with still another possible advantageous aspect of the invention, a system may be provided, using little or no additional dedicated hardware, for recording information concerning each and/or every access or attempted access made to a given workstation or some secured portion thereof. This enables the system to identify unauthorized access attempts, and/or to maintain a record of authorized accesses.

In accordance with still another possible beneficial aspect of the invention, the interconnected nature of a plurality of workstations and/or, preferably, a common control server or the like, permits a person remote from a given workstation to provide location, time- or event-specific information and/or instructions to users proximal the workstation, thereby greatly enhancing the overall efficiency and efficacy of the system.

Still another possible highly beneficial aspect of the invention derives from the nature of the workstation itself. Since the workstations themselves preferably incorporate computer systems suitable for performing many of the necessary functions of the overall system, the invention may be put into practice with minimal additional hardware beyond that already present in the workstation(s). The benefits in terms of cost, simplicity of implementation, and retrofitted installation, among others, will be immediately appreciated by those of ordinary skill in the art having the benefit of the present disclosure.

BRIEF DESCRIPTION OF THE DRAWINGS

The foregoing and/or other features and/or aspects of the present invention will be best appreciated by reference to a detailed description of the specific embodiments of the invention, when read in conjunction with the accompanying drawings, wherein:

FIG. 1 is a simplified block/schematic diagram of a workstation in accordance with one possible embodiment of the invention, and showing an illustrative case in which the workstation may be deployed as part of a network of workstations, each having access to a central control component, such as a computer server.

DETAILED DESCRIPTION OF PREFERRED EMBODIMENTS

In the disclosure that follows, in the interest of clarity, not all features of actual implementations are described. It will of course be appreciated that in the development of any such actual implementation, as in any such project, numerous engineering and technical decisions must be made to achieve the developers' specific goals and sub goals (e.g., compliance with system and technical constraints), which will vary from one implementation to another, Moreover, attention will necessarily be paid to proper engineering practices for the environment in question. It will be appreciated that such a development effort might be complex and time-consuming, but would nevertheless be a routine undertaking for those of ordinary skill in the relevant fields.

Referring to FIG. 1, there is shown a functional block diagram of a system 10 utilizing a secure workstation 20 in accordance with one embodiment of the invention.

At the outset, it is to be noted that the embodiment of the invention portrayed in FIG. 1 is intended to be an exemplar of the invention only, and certain particulars of the system shown in FIG. 1 are not necessarily utilized in every conceivable embodiment of the invention. In particular, the exemplary embodiment of FIG. 1 contemplates implementation of the invention in a hospital setting. Nevertheless, those of ordinary skill in the art having the benefit of the present disclosure will readily appreciate and recognize many other contexts in which the invention may be advantageously practiced.

With continued reference to FIG. 1, system 10 may preferably be implemented around at least one central server computer 12, which may physically reside at a location remote from other constituent system components. As will be hereinafter described, the constituent components of system 10 are preferably interconnected by means of a network 14. Those of ordinary skill will appreciate that the nature and extent of network 14 may vary from implementation to implementation, comprising in one possible implementation direct connections between individual components, or instead comprising a local area network (LAN), wide area network (WAN), or various other known interconnection schemes, which may or may not further rely upon various communication means, wireless and/or wired, as well as the connectivity resources of the Internet, as would be apparent to those of ordinary skill in the art.

Because one possible exemplary embodiment of FIG. 1 may be assumed to be implemented in a hospital environment, the server 12 may preferably be coupled to and/or in communication with at least one nurse station 16. A typical nurse station 16 may be centrally located with respect to a suite of patient rooms, and in a majority of cases has at least one computer and/or computer terminal enabling medical professionals to perform their respective functions. Although only a single nurse station 16 is shown in FIG. 1, it is to be understood that hospitals frequently have a plurality of nurse stations 16, each of which being preferably coupled to central server 12 via communications network 14.

Likewise, FIG. 1 depicts a security office 18 coupled to server 12 via network 14. Those of ordinary skill will recognize that any health-care facility (e.g., hospital) of reasonable size will include security systems and/or involve the active participation of security personnel to utilize such systems to ensure the safety and/or security of patients and/or employees at the facility. Security personnel are preferably able to communicate with central server 12, as depicted in FIG. 1, as part of its ongoing monitoring of operations at the facility. Security office 18 may comprise an authorization computer wherein access codes as discussed hereinafter for other computers are retrieved via the network as discussed hereinafter. While an authorization computer that is not available to unauthorized persons may be conveniently located in security office 18, depending on programming, other computers might also be programmed to act as authorization computers as might be allowed. This programming may provide for temporary use of some computers as authorization computers. In another embodiment, users with certain levels of access or access codes may utilize multiple or all computers as authorization computers.

Finally, and in accordance with another aspect of the invention, system 10 will include at least one workstation 20. As will hereinafter be described in greater detail, workstations 20 are preferably deployed at a plurality of locations throughout a healthcare facility. For example, a workstation may be provided in each patient room, and/or at one or more strategic locations outside of patient rooms, as well as in medical professionals' offices, laboratories and/or testing facilities, and so on, as will hereinafter become apparent.

A plurality of workstations 20 are depicted in FIG. 1, namely, workstations 20-1, 20-2 . . . 20-*n*, reflecting the indefinite number of workstations, which may be incorporated into a system in accordance with the present invention. Each workstation 20 may be coupled to central server 12 via network 14.

One workstation 20-1 is shown in greater detail than the others in FIG. 1, and as such, it can be seen that a workstation 20 preferably comprises an articulating cabinet 21 (represented by a dashed line in FIG. 1) for housing a computer system including a computer system 22, a user display device 24 (e.g., a CRT or LCD screen), and one or more user input devices 26, which might typically include an alphanumeric keyboard and/or a pointer device such as a mouse. In the presently disclosed embodiments, it is contemplated that the computer system contained within each workstation 20 comprises a conventional "personal computer" class of hardware, such as are found in ever-increasing abundance throughout the paths of modern society.

As used herein, the terms "computers," "computer system," "workstation," and "computer," shall be interchangeably interpreted broadly to encompass electronic devices of varying size and type, including, without limitation, laptop computers, notebook computers, tablet computers, personal digital assistants, and so on. As such, the particular implementation details of the workstation computer system will not be described herein in particular detail, such details being mere routine design variants and selections, which may vary from implementation to implementation.

Physically, a workstation cabinet 21 may take on a variety of configurations, including, without limitation, the forms shown in the above-referenced and incorporated Goza patents. In a preferred embodiment, a workstation cabinet 21 may be articulating in design, such that portions thereof can be "collapsed" or "folded" to reduce the space occupied by the workstation 20 when not in use, while at the same time affording easy user access as needed.

Those of ordinary skill having the benefit of the present disclosure will appreciate that a virtually endless array of design variants may be incorporated into the construction of a given workstation 20. For the purposes of the present invention, it is sufficient to recognize three specific features of a workstation 20 that may be particularly germane to the subject matter of this disclosure.

Firstly, a workstation cabinet 21 may preferably be articulating in some manner whereby one or more separate compartments 27 within the workstation 20 can be secured to restrict access to items contained within these one or more compartments 27. Secondly, a workstation 20 preferably also incorporates a locking mechanism 28 associated with a compartment 27, the locking mechanism being operable to maintain the secured compartment 27 in a "closed" or locked condition until released by predetermined means. Thirdly and lastly, a workstation 20 in accordance with the present invention preferably includes an access point 30 accessible to users when the secured compartment 27 has been locked into its secured position through operation of locking mechanism 28.

In an exemplary embodiment such as that of FIG. 1, access point 30 takes the form of a conventional numeric keypad adapted to accept user access requests in the form of numeric access codes. As previously noted, many other means of entering or communicating access requests may be employed in the practice of the present invention, including, for example, magnetic cards, "smart cards," RFID (radio-frequency identification) devices, biometric sensors, bar code scanners, and so on. Any of these devices may be utilized and/or programmed to produce in whole part an access code for use in locking and unlocking secured compartments such as medical cabinets, compartments to access computer equipment, and the like.

Furthermore, in another alternative embodiment, the access point 30 comprises the alphanumeric keyboard 26 associated with the computer system 22 itself. As would be understood by those of ordinary skill, such an embodiment would require the workstation 20 to be arranged such that the workstation keyboard may be accessible to users even when the compartment 27 is locked.

In yet another alternative embodiment, the computer itself (CPU 22, monitor 24 and/or keyboard 26) may be contained within a secured compartment 27, such that access to the computer may be permitted only through use of the activation point to gain access to the secured compartment 27. In this embodiment, for example only, keypads 30 and/or 34 might be used in order to gain access to keyboard and mouse 26, or the computer monitor, or the like.

As shown in FIG. 1, access point 30 may be preferably coupled to computer system 22 and/or to locking mechanism 28. In this way, user access requests entered at access point 30 can be conveyed to computer 22, in order for computer 22 to respond in a predetermined manner. For example, a response to a user access request may involve either the computer 22 and/or access point 30 to issue commands to the locking mechanism and causing the locking mechanism to unlock the secured portion 27 of workstation 20. Such would be the likely response to entry of a previously validated access code into access point 30 indicating that the requester of access is authorized to do so.

On the other hand, a much different response may occur to entry of an invalid access code into access point 30, such as by an unauthorized person attempting to access the secured portion 27 without the necessary approval and/or permission. In such a case, for example, computer 22 may issue notification messages that are conveyed via network 14 to security office 18 and/or nurse station(s) 16 alerting appropriate persons of the attempted unauthorized access. Access codes may be created or generated in whole or part, and/or input in whole or part into an authorization computer, as may be located in security office 18. Access codes may be revoked and all relevant computers on the network notified. Alternatively, access codes may be introduced through the authorization computer, which will allow access as necessary to relevant computers on the network. Access codes may allow access to some computers but not others. The various computers on the network may be programmed to receive access codes in whole or part from an authorization computer, which may be located in security office 18. Various types of access codes and/or means to construct and/or implement the access codes may be used as desired.

The access codes may be created in many different ways. They may be input from a user. They may comprise in whole or part information that is digitally saved which may be information derived from equipment serial numbers, plug n play information, random number generators, software numbers, hardware serial numbers, component numbers, ROM numbers, encrypted data, hashed numbers, or the like. The access codes may comprise at least some information specific to each workstation and/or a group of workstations and/or specific users and/or groups of users, if desired. The access codes may be generated or created at another location such as computers from another facility. Moreover, authorization computer(s) and/or servers and/or workstations may be located in different buildings of the same complex, across town or anywhere in the world, as desired.

The following outlines a number of scenarios that can take place during operation of system 10. However, many possible operating scenarios may be utilized some of which are discussed hereinbefore or subsequently, but the potential variation of operation of the invention is not intended to be limited to the scenarios discussed herein.

As noted above, one benefit of interconnecting various components of system 10 as described is that each workstation 20 may communicate, via network 14, certain functional information relating to the workstation 20 and/or peripheral equipment (not shown) coupled to the workstation 20. Such communications can be advantageously intercepted by server 12, nurse station(s) 16, and/or security facility 18, in order that appropriate actions can be taken in response to the attempted unauthorized access.

Another feature of the present invention relates to the ability of persons to communicate access code information and/or the like to computer 22, thereby enabling authorized users to access the secured portion(s) 27 of workstations 20 upon request.

As described above, any attempt to access entered into access point 30 may be communicated to computer 22 for analysis and/or validation. Such analysis may involve, for example, comparison of the access attempt codes with a database of pre-approved codes. This database may be maintained, for example, locally at a workstation 20 in memory associated with computer 22, and/or may be maintained at central server 12. In the latter case, an access code entered into access point 30 may be forwarded by computer 22 to server 12, with server 12 possibly thereafter issuing a communication to processor 22 establishing the parameters of the requester's access, if any, to various system components. Locking mechanism 28 can at that point be released.

A further advantage of the present invention may be that it provides a means by which each attempt to access a secured portion 27 of workstation 20 may be recorded for retrieval at a later time. In a similar vein, the invention provides a means by which instructions can be transmitted to each workstation 20 to modify behaviors in desired ways. For example, a nurse at station 16 may determine that a certain process should be initiated for a patient based upon data received at nurse station 16, server 12, or elsewhere. Such commands can be predetermined in a given implementation.

The security of system 10 is also believed to be of particular importance. Due to the general interconnectedness of the various constituent components of system 10 via network 14, it must be recognized that any access point 30 might provide access to any number of associated systems, and the potential for misuse of such access cannot be underestimated. On the other hand, the interconnectedness of the system components advantageously provides mechanisms and processes to protect against unauthorized access. As noted above, an access request entered at an access point 30 may be evaluated either within the associated workstation 20 and/or after forwarding to central server 12. In the latter case, the authorization status of any given access code can be dynamically established at the server 12. This enables immediate responsiveness to both authorized and unauthorized accesses. At the central server 12, persons can be granted or denied access in real time as necessary and desired.

In accordance with another notable aspect of the present invention, the functionality of access point 30 and/or lock 28 may be realized through instantiation of appropriate processes executed by local computer 22, which itself may be secured by a locking mechanism 28. That is, computer 22 already existing and generally unutilized within a secured workstation 20 may be advantageously utilized in part or in whole to control the locking mechanism 28 that protects one or more secured portions of the workstation. In the case that the computer itself may be contained within a secured portion of the workstation, the computer 22 itself controls the locking mechanism 28 that protects the computer 22. Those of ordinary skill in the art will readily appreciate the benefits and advantages of utilizing secured computational resources to control the very mechanism that secures these computational resources.

In one embodiment, it is contemplated that access point 30, in the form of a simple numeric keypad, can be coupled to computer 22, in the form of a conventional "personal computer" class of hardware via a conventional communications link, for example, a USB connection, serial connection, wireless, or any other suitable interface.

The interconnectedness of the components of system 10 affords further beneficial opportunities. For example, messages, commands, alerts, and so on may be issued at the location of a nurse station 16 and/or instantly communicated to any or all workstations 20.

The benefits afforded by communications between workstations 20 and remote locations, including, for example, server 12 and/or one or more nurse stations 16 will be recognized by those of ordinary skill in the art. The present invention enhances these benefits by preventing misuse by unauthorized users.

In one possible embodiment, external medical box(es) and/or external compartment(s) and/or other external cabinet(s) 32 may be operated by associated keypads 34, and/or by keypad 30, and/or by keyboard and/or mouse and/or other input devices as designated by numeral 26. Thus, a single keypad or mouse or other input may operate multiple compartments, or each compartment may have a particular input device, or multiple input devices may be used to control one or more compartments. The desired supervisory control of operation of secured compartment(s) 32 may be set forth and/or varied by programming of CPU 22 and/or other network linked computers by such security office computer 18, nurse station(s) computer(s) 16, computer server(s) 12, other workstations, and/or the like as desired by programming specifications and/or architecture. The present invention may utilize a single computer, such as CPU 22, to lock and/or unlock a single secured storage compartment or multiple storage compartments, such as external box 32 and medicine box 27, and/or other secured compartments (not shown).

In one possible embodiment, keypad 34 and/or external medical box 32 may be interconnected via a suitable interface with CPU 22. Keypad 34 may or may not be present for use with medical box 32, and keypad 30 may or may not be present for use with med box 27, depending on the configuration of a system. Alternatively, a single keypad, such as keypad 30 or keypad 34 may be utilized for both or additional secured compartments, such as secured compartments 27 and 32.

A suitable computer interface may include control signals, data signals, and/or power lines. In one embodiment, the locking mechanism may comprise electronics and power whereby only control information is provided by interface with CPU 22. In another embodiment, data may also be provided in the interface to provide relevant status information such as a door open or closed status, lock engaged or not, temperature, weight or pressure or optical sensors to indicate how much medicine is in the compartments, and/or the like. In another embodiment, a hardwired interface may also provide power, or alternatively, power for the locking mechanism and/or sensors may be provided through a separate power supply.

In one possible embodiment, external medicine box(es), compartments, and/or external cabinet(s) 32 may be mounted within the walls of the building of a medical facility or the like. Various configurations for mounting may be used for mounting one or more medicine boxes, compartments and/or external cabinets(s) 32. If multiple boxes are mounted in a wall in pass-through fashion to permit stocking the compartments without disturbing the patients, then the present invention provides a means for controlling one or more doors thereof with access codes as described hereinbefore, such as controlling the stocking door to the medicine compartment for use with different access codes than the dispensing door. In another embodiment, external medical box(es) or closets or external cabinet(s) 32 may be mounted within cabinets that may be mounted on wheels to be moveable, or may be fixed in position. In another embodiment, features of the present invention might be utilized for controlling locking closets, doors, locks on equipment, and other uses for electronically controlled locks in various types of industries.

In one possible embodiment boxes or compartments 27 and/or 32 are connected directly to CPU 22 and may be operated only by use of keypads 30 or 34, or by keyboard or mouse 26. In other words, in this embodiment, only workstation 20-1 can be used to lock and unlock compartments 27 and/or 32. Likewise, in this embodiment, only workstations 20-2 . . . **20-*n* may be used to operate similar compartments that are connected thereto, respectively. It is noted that workstation 20-1 is representative and so details of the remaining workstations and their associated compartments are not shown. In this embodiment, the access code for workstation 20-1 may be obtained and/or sent over the network from an authorization computer or authorization workstation, which may be located in security office 18 or as desired. The authorization computer may or may not be able to control boxes or compartments 27 and 32 directly so that locking and unlocking of compartments 27 and 32 may or may not be required to come only from input devices directly to workstation 20-1. Likewise, other or selected of workstations 20-2 may or may not be able to unlock or lock compartments not directly connected thereto such as compartments 27 and 32. Programming may provide that compartments 27 and 32 may be locked but not unlocked, or unlocked but not locked by other networked computers besides that of workstation 20-1. Accordingly, the system programming can be configured to control compartments 27 and/or 32** and the other compartments connected or interfaced to the other workstations in many different ways, as desired.

In another embodiment, other devices may be attached to the network either directly or through interface with one or more CPUs 22 as discussed hereinbefore. For instance, RFIDs may be used to locate and track medicine bottles or packages, medical equipment, beds, instruments, medicine containers, sponges used in operations, personnel, and the like. Thus, each computer, whose location is known, may be utilized to track and/or locate a physical presence of any hospital equipment and/or hospital related items. Cameras, speakers, alarms, and the like may allow additional information to flow to and from doctors, nurses, patients, visitors, and/or other persons.

In one embodiment, the present invention may be implemented utilizing articulating workstations in hospital hallways, patient rooms, examining rooms, and so on as described hereinbefore. However, the present invention may also be utilized in other industries, buildings, structures, and the like.

From the foregoing detailed description, it should be apparent that a system and method for restricting access to a user workstation or to a secured portion thereof has been disclosed. An embodiment is disclosed which might be implemented within a medical facility or the like, although features of the present invention may be implemented in other buildings and/or facilities. Accordingly, although a specific embodiment of the invention has been described herein, it is to be understood that this has been done solely for the purposes of illustrating various features and aspects of the invention, and is not intended to be limiting with respect to the scope of the invention, as defined in the claims. It is contemplated and to be understood that various substitutions, alterations, and/or modifications, including such implementation variants and options as may have been specifically noted or suggested herein, may be made to the disclosed embodiment of the invention without departing from the spirit or scope of the invention.

What is claimed is:

1. A securable compartment within a computer workstation and controlled by said computer workstation, comprising:

an articulating cabinet;

a locking mechanism operatively connected to said securable compartment for selectively locking and unlocking said securable compartment;

a computer for said computer workstation, said computer being supported within said articulating cabinet and providing a computer function other than securing said securable compartment;

an access point functionally coupled to said computer and mounted externally to said securable compartment, said access point being operable for entry of requests for access to said securable compartment when said securable compartment is locked by said locking mechanism, and wherein said computer is responsive to entry of an authorized access request at said access point to cause said locking mechanism to unlock said securable compartment;

at least one authorization computer programmed to provide a plurality of access codes to comprise at least part of said authorized access request, said computer being functionally coupled to said at least one authorization computer, said computer being further programmed for utilizing respective ones of said plurality of access codes for determining whether an access request is authorized or unauthorized;

wherein said securable compartment is defined within said articulating cabinet; and wherein said securable compartment prevents access to one or more components of said computer when locked.

2. The securable compartment within said computer workstation of claim 1, further comprising a keyboard for said computer, wherein said securable compartment prevents access to said keyboard when locked, and further comprising a second securable compartment which is positioned externally to said articulating cabinet.

3. The securable compartment within said computer workstation of claim 1, further comprising a computer monitor for said computer, wherein said computer is mounted within said articulating cabinet and said securable compartment prevents access to said computer monitor when locked, and wherein said computer is functionally coupled to a central server.

4. The securable compartment within said computer workstation of claim 3, wherein said central server is programmed to maintain a database of authorized access requests.

5. A method for a computer workstation for controlling at least one securable compartment within said computer workstation, comprising:

providing an articulating cabinet;

mounting a computer for said computer workstation within said articulating cabinet; said computer being supported within said articulating cabinet;

mounting a locking mechanism for selectively locking and unlocking said at least one securable compartment;

functionally coupling said computer to said locking mechanism and providing a computer function other than securing said at least one securable compartment;

providing an access point mounted externally to said securable compartment to users for entry of requests for access to said at least one securable compartment when said at least one securable compartment is locked by said locking mechanism; and programming said computer to be responsive to entry of an authorized access request at said access point to cause said locking mechanism to release and unlock said at least one securable compartment;

wherein said at least one securable compartment is defined within said articulating cabinet; and wherein said at least one securable compartment configured to control one or more components of said computer when locked.

6. The method of claim 5 further comprising a keyboard for said computer, wherein said at least one securable compartment prevents access to said keyboard when locked, and further comprising defining a second securable compartment externally to said articulating cabinet.

7. The method of claim 5 further comprising a computer monitor for said computer, wherein said at least one securable compartment prevents access to said computer monitor when locked, and wherein said computer is functionally couple to a central server.

8. The method of claim 7, programming said central server to maintain a database of authorized access requests.

9. The method of claim 5, further comprising: functionally coupling said computer to at least one authorization computer; programming said authorization computer to provide a plurality of access codes for entry as at least part of said authorized access request; programming said computer to receive at least respective ones of said plurality of access codes, and further programming said computer for utilizing said respective ones of said plurality of access codes for determining whether an access request is authorized or unauthorized.

10. A system for controlling access to a plurality of secured compartments within a facility, comprising:

at least one articulating cabinet configurable in both an open position and a closed secured position to define at least one of said plurality of secured compartments;

a plurality of computers electronically connected together to create a network, said plurality of computers being positioned within said facility; and at least one of said computers being supported within said at least one articulating cabinet and providing a computer function other than securing said plurality secured compartments;

a plurality of locking mechanisms electronically interfaced to respective of said plurality of computers, said plurality of secured compartments being locked and unlocked by respective ones of said plurality of locking mechanisms to selectively secure said computers within said secured compartments, respectively;

a plurality of input devices mounted externally to said plurality of secured compartments for respective ones of said plurality of computers, said plurality of input devices being operable to input a plurality of access codes; and at least one authorization computer, said at least one authorization computer being programmed to produce at least a portion of said plurality of access codes for said plurality of computers, said plurality of computers being programmed to operate respective ones of said plurality of locking mechanisms responsively to a respective access code from respective ones of said plurality of input devices; and wherein at least one of said plurality of secured compartments encloses computer components to secure a respective one of said plurality of computers, said computer components comprises at least one of a keyboard or a computer monitor for said respective one of said plurality of computers, and wherein when said at least one of said plurality of secured compartments is locked, then access is prevented to said at least one of said keyboard or said computer monitor for said respective one of said plurality of computers.

11. The system of claim 10, further comprising: a plurality of walls throughout said facility, and wherein at least one of said plurality of secured compartments is built into one of said walls, wherein said at least one of said plurality of secured compartments comprises two doors comprising a stocking door and a dispensing door, and wherein said two doors permit access to said at least one of said plurality of secured compartments in pass through fashion through said wall.

12. The system of claim 10, further comprising: a plurality of cabinets in which respective ones of said plurality of computers are positioned.

13. The system of claim 10, further comprising: at least one computer programmed to keep a record of usage of said plurality of access codes.

14. The system of claim 10, further comprising: at least one computer programmed to keep a record of failed attempts to access said plurality of secured compartments.

15. The system of claim 10, wherein: respective of said plurality of input devices comprise at least one of a keyboard, biometric sensor, RFID, camera, dongle, wireless communication device, proximity card, and magnetic strip.

16. A method for controlling access to a plurality of secured compartments within a facility, comprising:

providing at least one articulating cabinet configurable in both an open position and a closed secured position to form at least one of said plurality of secured compartments within said at least one cabinet; and mounting at least one of said plurality of computers being supported within said at least one cabinet, wherein said at least one computer comprises at least one of a key board or a computer monitor, and wherein when said at least one of said plurality of secured compartments are locked, then access is prevented to said at least one of said keyboard or said computer monitor;

distributing said plurality of secured compartments through said facility;

electronically interconnecting a plurality of computers to create a network;

distributing said plurality of computers that provide a computer function other than securing said plurality of secured compartments through said facility;

electronically interfacing a plurality of locking mechanisms to respective ones of said plurality of computers;

mounting said plurality of secured compartments such that said plurality of secured compartments are locked and unlocked by respective ones of said plurality of locking mechanisms;

interfacing a plurality of input devices to respective ones of said plurality of computers;

providing said plurality of input devices externally to respective secured compartments to be operable to input a respective access code for locking and unlocking a respective locking mechanism;

programming at least one authorization computer to provide at least portions of a plurality of access codes to said plurality of computers; and programming said plurality of computers to receive respective of said plurality of access codes through said network and to lock and unlock respective of said plurality of locking mechanisms responsively to receiving said access code through respective of said plurality of input devices.

17. The method of claim 16, further comprising: mounting at least one of said plurality of secured compartments within one of a plurality of walls of said facility, wherein said at least one of said plurality of secured compartments comprises two doors on opposite sides comprising a stocking door and a dispensing door, and wherein said two doors permit access to said at least one of said plurality of secured compartments in pass through fashion through said wall.

18. The method of claim 16, further comprising: providing a plurality of cabinets in which respective of said plurality of computers are positioned.

19. The method of claim 16, further comprising: utilizing at least one of said plurality of secured compartments to enclose computer components of a respective one of said plurality of computers to limit access to said respective one of said plurality of computers, wherein said respective one of said plurality of computers comprises at least one of a keyboard or a computer monitor, and wherein when said at least one of said plurality of secured compartments are locked, then access is prevented to said at least one of said keyboard or said computer monitor.

20. The method of claim 16, further comprising: programming at least one computer to keep a record of usage of said plurality of access codes.

21. The method of claim 16, further comprising: programming at least one computer to keep a record of failed attempts to access said plurality of secured compartments.

22. The method of claim 16, further comprising: providing that respective ones of said plurality of input devices comprise at least one of a keyboard, biometric sensor, RFID, camera, dongle, wireless communication device, proximity card, and magnetic strip.

* * * * *